United States Patent [19]

Fukushima et al.

[11] Patent Number: 5,059,648
[45] Date of Patent: Oct. 22, 1991

[54] RUBBER COMPOSITION

[75] Inventors: Motoo Fukushima, Kanagawa; Tsutomu Nakamura, Gunma; Hiroyuki Ohata; Harukazu Okuda, both of Fukui, all of Japan

[73] Assignee: Nissin Chemical Industry Co., Ltd., Fukui, Japan

[21] Appl. No.: 427,049

[22] Filed: Oct. 25, 1989

[30] Foreign Application Priority Data

Oct. 27, 1988 [JP] Japan ............................. 63-271467
Sep. 26, 1989 [JP] Japan ............................. 1-250213
Sep. 26, 1989 [JP] Japan ............................. 1-250214

[51] Int. Cl.$^5$ ............................................. C08K 5/06
[52] U.S. Cl. ................................. 524/376; 524/377; 524/380
[58] Field of Search ................. 524/380, 377, 367, 269

[56] References Cited

U.S. PATENT DOCUMENTS 4,358,558 11/1982 Shimizu ........................... 524/379
4,678,828 7/1987 Makomura et al. ............... 524/265

FOREIGN PATENT DOCUMENTS 63-097664A 4/1988 Japan .

Primary Examiner—Paul R. Michl
Assistant Examiner—John J. Guarriello
Attorney, Agent, or Firm—Wyatt, Gerber, Burke and Badie

[57] ABSTRACT

A rubber composition based on a rubbery polymer and a silica-based reinforcing filler can be imparted with a greatly improved workability in roll milling and molding as well as in the mechanical properties of the vulcanizates prepared therefrom when the rubber composition is admixed with an acetylene alcohol or an alkylene-oxide adduct of acetylene alcohol presumably by virtue of the improvement in the dispersibility of the reinforcing filler in the rubbery matrix. The improvement obtained by the addition of the acetylene alcohol compound is not limited to the dispersibility of silica fillers but also to the dispersibility of carbon black when the rubbery polymer is an organopolysiloxane-modified acrylic polymer.

6 Claims, 1 Drawing Sheet

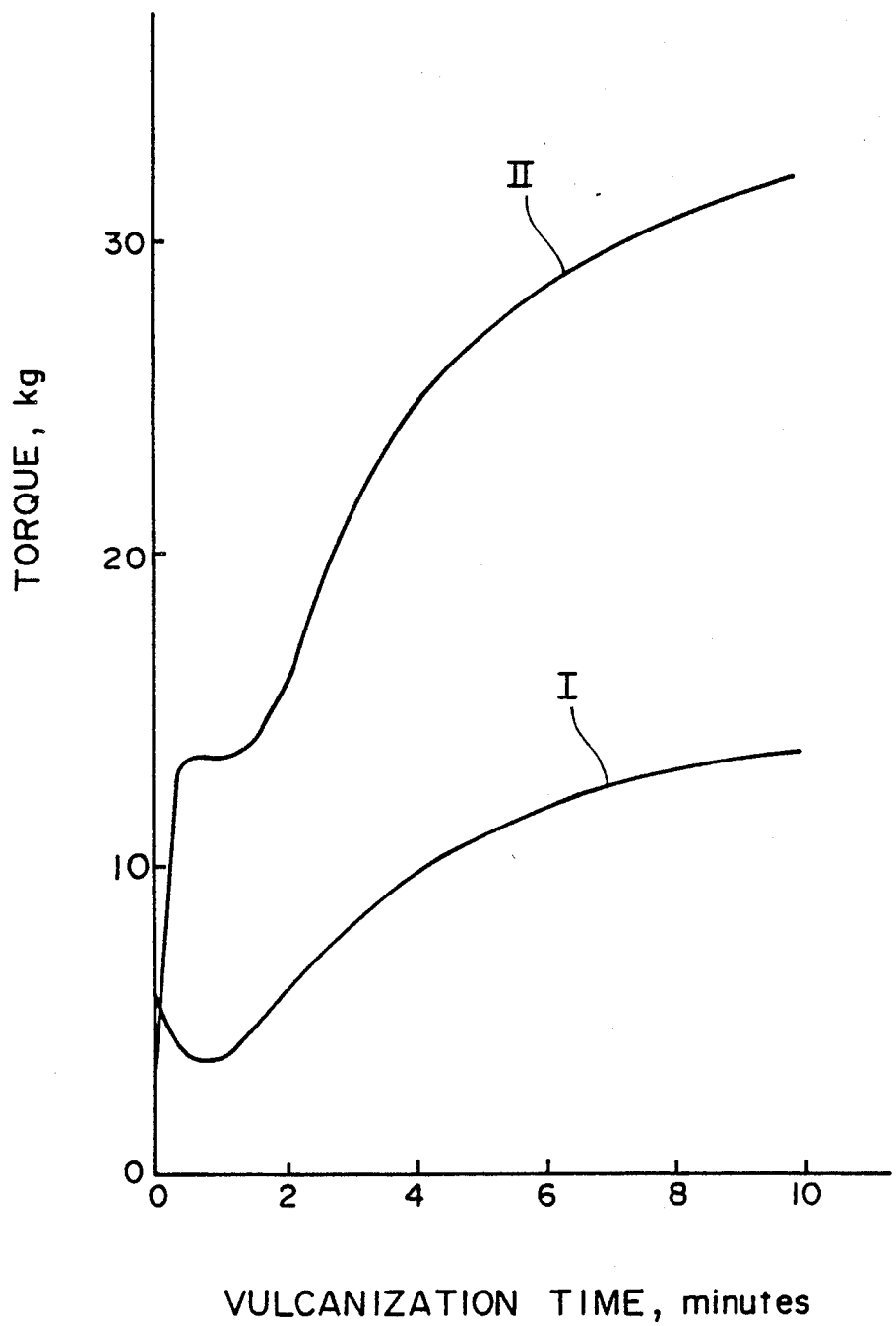
FIGURE

RUBBER COMPOSITION

BACKGROUND OF THE INVENTION

The present invention relates to a rubber composition or, more particularly, to a rubber composition compounded with a finely divided reinforcing filler capable of exhibiting greatly improved flowability and workability in the roll milling and molding works and capable of giving a vulcanizate having excellent mechanical properties, heat resistance and other properties.

Needless to say, carbon black is the most widely used filler, among various kinds of reinforcing and non-reinforcing fillers, in rubber compositions based on natural or synthetic rubbers. This is because particles of carbon black have an oleophilic or organophilic surface having high affinity with polymer molecules of the rubber along with the extremely large specific surface area thereof so as to exhibit an outstandingly high reinforcing effect. A problem in carbon blacks as a filler in rubber compositions is that the rubber compositions compounded with a substantial amount of carbon black are always black in color so that carbon black cannot be used when a rubber article of white or a light color as well as when an aesthetically desirable color of the rubber article is desired.

As a class of light-colored fillers capable of giving a rubber article of a color other than black, finely divided silica fillers can be used advantageously in a rubber composition and a rubber composition compounded with a silica filler gives a rubber vulcanizate having excellent heat and aging resistance, tear strength and resistance against crack formation by bending as well as good adhesion to the substrate surface on which the composition is vulcanized.

On the reverse side of the above mentioned advantages, silica fillers have a problem in respect of the affinity with and the dispersibility in the matrix of the polymeric molecules of natural and synthetic rubbers because a large number of silanolic hydroxy groups are usually bonded to the silicon atoms on the surface of the silica filler particles. Therefore, a rubber composition compounded with a silica filler sometimes has an unduly increased consistency to greatly decrease the workability of the composition and the properties of the vulcanizate obtained from the composition.

Various attempts and proposals have been made hitherto to solve the above mentioned problem of the poor dispersibility of silica fillers in a rubbery polymer. For example, it is proposed that a silica filler-loaded rubber composition is compounded with an alcoholic compound such as polyethylene glycols and the like or a surface active agent though with only a limited effect on the dispersibility of the filler as compared with carbon blacks in general. It should also be noted that polyethylene glycols are contained in the composition as a mere additive ingredient which never pertains to the crosslinking reaction so that addition of such an additive sometimes adversely affects the properties or, in particular, permanent compression set of the rubber vulcanizate prepared from the rubber composition. It is also proposed that finely divided silica fillers are subjected, prior to compounding with a rubber, to a surface treatment with an alcoholic compound, organosilane or organopolysiloxane compound and the like. This method is indeed effective in improving the dispersibility of the filler in the rubber matrix and could be widely practiced if it were not for the large costs required for the pretreatment of the filler. No sufficient improvement can be obtained in the dispersibility of the filler by compounding a rubber composition simultaneously with a silica filler and an organosilane compound.

On the other hand, Japanese Patent Kokai 61-225243 teaches that acrylic rubbers can be imparted with improved long-term heat resistance and resistance against greases and water by compounding with a non-carbon filler but nothing is mentioned there on the problem of the dispersibility of the filler in the rubbery matrix and the workability of the rubber composition. Further, Japanese Patent Kokai 55-31817 teaches that an improving effect can be obtained in the permanent compression set of a vulcanizate of a silica filler-loaded natural or synthetic rubber composition by admixing with an organopolysiloxane. Admixture of an organopolysiloxane alone, however, has little effects on the dispersibility of the silica filler. In particular, acrylic rubbers and the like having a relatively low green strength give a composition having a high Mooney viscosity when compounded with a silica filler due to the particularly poor dispersibility of the silica filler therein so that a rubber vulcanizate having a complicate configuration can hardly be prepared from such a rubber composition. This difficulty is due to the abnormal increase in the torque of the composition in the step of temperature elevation in the molding process of the composition to greatly decrease the flowability thereof without decrease the torque at the intitial stage of the temperature elevation as in most of other types of rubber compositions.

As a class of synthetic rubbers, silicone rubbers are compounded usually with a finely divided silica filler as a reinforcing agent. Vulcanizates of such a silica filler-loaded silicone rubber have excellent heat and cold resistance and weatherability as well as good electrical properties so that silicone rubebrs are widely used in various fields of industries. One of the disadvantageous properties in silicone rubbers is that vulcanizates of silicone rubbers usually have relatively poor resistance against oils and solvents, e.g., gasoline, exhibiting large swelling therewith even after complete crosslinking and curing by use of an organic peroxide and the like as a crosslinking agent. This defective property is an inherency of the dimethylpolysiloxane which is, in most cases, the principal ingredient in silicone rubber compositions.

With an object to solve the above mentioned problem of poor oil resistance in general purpose-grade silicone rubbers, an oil resistant-grade silicone rubber has been developed by replacing a part of the methyl groups in the dimethylpolysiloxane with 3,3,3-trifluoropropyl groups. Such special grade silicone rubbers, however, are not widely employed in practical applications due to the extremely high costs for the preparation of the fluorine-containing organopolysiloxane.

In connection with the problem of oil and solvent resistance of a rubber vulcanizate, acrylic rubbers are known to be excellent in this regard along with fairly high heat resistance so that they are highlighted in the applications to automobile parts. Acrylic rubbers, however, have other problems in the relatively low cold resistance and poor workability in roll milling and molding so that it is eagerly desired in the rubber industry to improve acrylic rubbers in these regards and various proposals and attempts have been made.

For example, it has been proposed to compositely combining a silicone rubber and an acrylic rubber to compensate the defective properties of one rubber with the excellent properties of the other. Thus, Japanese Patent Kokai 55-7814 and 60-152552 teach preparation of a silicone-acrylic rubber blend having good workability in roll milling and molding without the problem in the compatibility of different polymers and capable of being cured by using an organic peroxide by compounding a copolymer of an organopolysiloxane having ethylenically unsaturated groups, e.g., vinyl groups, and an acrylic acid ester with a rubber blend of an unvulcanized organopolysiloxane gum and an unvulcanized acrylic rubber.

The above described composite rubber composition also have several disadvantages. For example, the additive copolymer of an organopolysiloxane having ethylenically unsaturated groups and an acrylic acid ester may sometimes be gelled when the molecular weight thereof is high as a consequence of the polymerization reaction between the vinyl groups and the acrylic unsaturated groups. Further, the additive copolymer is not co-crosslinkable with the rubbery polymers in the crosslinking reaction with an organic peroxide and the like because the copolymer lacks crosslinking points such as unsaturated groups so that the vulcanizates obtained from the composite rubber composition may sometimes have relatively poor mechanical properties, especially, when the added amount of the additive copolymer is increased with an object to fully obtain the improving effect by the addition thereof.

While it is desirable in the above described composite rubber composition that the amount of the organopolysiloxane relative to the acrylic rubber should be as small as possible in respect of the costs and the oil resistance of the vulcanizate, the amount of the organopolysiloxane must sometimes be increased to exceed 50% by weight in order to achieve substantial improvement in certain properties such as cold resistance of the rubber vulcanizate as is evidenced by the results of the TR test according to ASTM D-1329 or Gehman torsion test according to ASTM D-1053 which give a measure of the flexibility of a rubber vulcanizate at low temperatures.

Alternatively, Japanese Patent Publications 54-3512, 54-6271 and 55-14086 disclose a copolymer based on an acrylic polymer and capable of giving a cured product having improved heat and cold resistance, weatherability and impact strength prepared by the copolymerization of an acrylic monomer and an organopolysiloxane. These copolymeric polymers, however, are readily gelled when a polymer of a high degree of polymerization is prepared because the copolymerization reaction is performed in most cases by utilizing the radical-polymerizability of the vinyl-containing organopolysiloxane so that the copolymer can rarely give a rubber vulcanizate having high mechanical properties but the application thereof is limited to coating compositions and resinous products.

Japanese Patent Publication 54-6271 also discloses copolymerization of a mercapto group-containing organopolysiloxane and a vinyl monomer including acrylic monomers. The copolymer disclosed there, however, cannot be used as an ingredient of a rubber composition because the organopolysiloxane used there contains trifunctional $RSiO_{1.5}$ units and tetrafunctional $SiO_2$ units in addition to the lack of crosslinkable monomeric moiety derived from an active halogen-containing monomer, epoxy group-containing monomer or $\equiv Si-CH=CH_2$ group-containing monomer.

As is taught in U.S. Pat. No. 3,622,547, Japanese Patent Publication 49-13215 and Japanese Patent Kokai 58-222129, known crosslinking agents for an acrylic rubber, of which active halogen-containing groups provide the crosslinking points, include trithiol-S-triazine compounds, sulfur and metal soaps. Although di- or trithiol-S-triazine compounds as a vulcanizing agent of an acrylic rubber serve to considerably improve the heat resistance of the rubber vulcanizate, they are not widely used in practical applications because of the relatively poor storage stability of the rubber composition compounded therewith. The above named patent documents, however, are silent on the problem of the poor dispersibility of a finely divided reinforcing filler in the rubber composition.

SUMMARY OF THE INVENTION

An object of the present invention is therefore to provide a novel rubber composition loaded with a finely divided reinforcing filler, in which the dispersibility of the filler is greatly improved, capable of exhibiting a relatively low consistency and good workability in roll milling and molding and giving rubber vulcanizates having excellent properties without the above described problems and disadvantages in the prior art rubber compositions.

In particular, the invention provides a novel rubber composition loaded with a reinforcing filler, of which the polymeric rubbery ingredient is an acrylic rubbery polymer or organopolysiloxane-modified acrylic polymer, free from the above described problems and disadvantages in the prior art rubber compositions.

Thus, the rubber composition of the invention comprises, as a blend:
(a) 100 parts by weight of a rubbery polymer which can be natural rubber or a synthetic rubber;
(b) from 10 to 200 parts by weight of a finely divided reinforcing filler having a specific surface area of at least 30 $m^2$/g; and
(c) from 0.1 to 10 parts by weight of an acetylene alcohol or an alkylene oxide adduct thereof.

In addition to the above defined essential ingredients, the composition may further comprise:
(d) up to 10 parts by weight, per 100 parts by weight of the component (a), of an organopolysiloxane represented by the average unit formula $$R_aSiO_{(4-a)/2},\qquad (I)$$

in which R is a hydrogen atom or a substituted or unsubstituted monovalent hydrocarbon group and the subsctipt a is a positive number in the range from 1 to 2.5, having an average degree of polymerization not exceeding 40.

BRIEF DESCRIPTION OF THE DRAWING

The FIGURE is a graphic showing increase of the torque of the rubber compositions prepared in Example 7 (curve I) and in Comparative Example 4 (curve II) described below under milling by vulcanization as a function of time at 165° C.

DETAILED DESCRIPTION OF THE PREFERRED EMBODIMENTS

As is described above, the essential ingredients in the inventive rubber composition are the above defined components (a), (b) and (c), of which the most characteristic ingredient is the component (c) uniformly admixed with the rubbery matrix formed by the component (a). This component (a) is natural rubber or a synthetic rubber which is exemplified by styrene-butadiene copolymeric rubbers, acrylonitrile-butadiene copolymeric rubbers, hydrogenated acrylonitrile-butadiene copolymeric rubbers, polybutadiene rubbers, polyisoprene rubbers, polychloroprene rubbers, ethylenepropylene copolymeric rubbers, terpolymeric rubbers of ethylene, propylene and a diene monomer, acrylic rubbers, ethylene-acrylic ester copolymeric rubbers, ethylene-vinyl acetate copolymeric rubbers, urethane rubbers, polysulfide rubbers, chlorosulfonated polyethylene rubbers, chlorinated polyethylene rubbers, fluorocarbon rubbers, epichlorohydrin rubbers and the like as well as organopolysiloxane-modified acrylic rubbers. These synthetic rubbers as well as natural rubber can be used either singly or as a combination of two kinds or more according to need.

Although the advantageous effect in the inventive rubber composition obtained by the addition of the specific and unique ingredient as the component (c) is not limited to a specific rubber or rubbers among the above named ones, the improvement obtained thereby is most prominent when the rubbery polymer is an acrylic rubber or an organopolysiloxane-modified acrylic polymer which is a copolymerizate obtained by the copolymerization of an organosiloxane compound and an acrylic monomer capable of being vulcanized to give a rubbery elastomer. In particular, an organopolysiloxane-modified acrylic polymer prepared by the following method gives excellent properties of the vulcanizates.

Thus, an organopolysiloxane represented by the average unit formula

$$R^1{}_b SiO_{(4-b)/2},\qquad (II)$$

in which $R^1$ is a substituted or unsubstituted monovalent hydrocarbon group and the subscript b is a positive number in the range from 1.98 to 2.02, from 0.0025 to 10% by moles of the groups denoted by $R^1$ being mercapto-substituted monovalent hydrocarbon groups, is emulsified in an aqueous medium to give an aqueous emulsion into which a monomeric mixture composed of from 90 to 99.9% by moles of an acrylic monomer and from 0.1 to 10% by moles of a mercapto-reactive monomer which is a monomeric compound having an active halogen atom or an epoxy group in the molecule or a monomeric organisilicon compound having a silicon-bonded vinyl group, is added and the monomers are copolymerized in the presence of the emulsified organopolysiloxane represented by the formula (II) and a radical polymerization initiator. In the following, the method for the preparation of the organopolysiloxane-modified acrylic polymer according to the above mentioned principle is described in detail.

The organopolysiloxane to be emulsified in an aqueous medium is represented by the above given average unit formula (II). In the formula, the symbol $R^1$ denotes a monovalent hydrocarbon group exemplified by alkyl groups, e.g., methyl, ethyl, propyl, butyl and octyl groups, alkenyl groups, e.g., vinyl and allyl groups, aryl groups, e.g., phenyl and tolyl groups, and cycloalkyl groups, e.g., cyclohexyl group, or a substituted monovalent hydrocarbon group obtained by replacing a part or all of the hydrogen atoms in the above named hydrocarbon groups with halogen atoms, cyano groups, mercapto groups and the like exemplified by chloromethyl, 3,3,3-trifluoropropyl, 2-cyanoethyl, mercaptomethyl and 3-mercaptopropyl groups.

It is essential in the organopolysiloxane of the formula (II) that from 0.0025 to 10% by moles of the groups denoted by $R^1$ are mercapto-substituted monovalent hydrocarbon groups such as mercaptomethyl and 3-mercaptopropyl groups, to provide the reaction points with the acrylic copolymer. When the molar fraction of the mercapto-substituted groups is too small, the number of the bonding linkages between the organopolysiloxane and the acrylic copolymer is correspondingly small so that no desired improvement could be obtained in the milling workability of the rubber composition and in the cold resistance of the rubber vulcanizate. A too large molar fraction of the mnercapto-substituted groups is undesirable due to the possible scission of the polysiloxane linkages by the reactivity of the mercapto groups and a decrease in the chain length of the acrylic copolymer resulting in poor mechanical properties of the rubber vulcanizates.

The subscript b is a positive number in the range from 1.98 to 2.02. When the value of b is too small, the organopolysiloxane-modified acrylic polymer could not exhibit high elongation as a rubbery polymer. A too large value of b means that the organopolysiloxane has a relatively small molecular weight so that the organopolysiloxane-modified acrylic polymer obtained from such an organopolysiloxane could not give sufficiently high mechanical strengths to the rubber vulcanizates. The organopolysiloxane should preferably have a linear-chain molecular structure although a small amount of branched or network-like structure may have no particularly adverse influences. The average degree of polymerization of the organopolysiloxane is in the range from 100 to 10,000 or, preferably, from 4,000 to 8,000. When the average degree of polymerization of the organopolysiloxane is too high, certain difficulties may be caused in roll milling of the organopolysiloxane-modified acrylic polymer with the reinforcing filler. The group terminating the molecular chain end of the organopolysiloxane is not particularly limitative but it is usually selected from trimethylsilyl, dimethylvinylsilyl, hydroxy and alkoxy, e.g., methoxy, groups.

Any known method is applicable to the preparation of an aqueous emulsion of the above described organopolysiloxane. Basically, an aqueous emulsion can be prepared by vigorously agitating a mixture of the organopolysiloxane in an aqueous medium containing a surface active agent as an emulsifier. Alternatively, a low-molecular organopolysiloxane is first emulsified in an aqueous medium and then polymerized therein with a suitable polymerization catalyst such as a phenyl sulfonic acid substituted with a long-chain aliphatic hydrocarbon group to give an aqueous emulsion of the above described organopolysiloxane. The aqueous emulsion should preferably contain from 30 to 50% by weight of the organopolysiloxane from the standpoint of stability of the emulsion and the productivity.

The acrylic monomer, which is one of the constituents of the monomeric mixture to be copolymerized in the above described aqueous emulsion, is exemplified by alkyl acrylates, e.g., methyl acrylate, ethyl acrylate and butyl acrylate, alkoxy-substituted alkyl acrylates, e.g., methoxyethyl acrylate and ethoxyethyl acrylate, alkylthio acrylates, cyanoalkyl acrylates and the like. These acrylic monomers can be used either singly or as a combination of two kinds or more according to need.

The acrylic monomer is combined in the monomer mixture and copolymerized with a monomer having a functional group capable of providing a crosslinking point in the copolymer such as a mercapto-reactive monomer which is a monomeric compound having an active halogen atom or an epoxy group in the molecule or a monomeric organosilicon compound having a silicon-bonded vinyl group. Examples of the active halogen-containing monomeric compound include vinyl chloroacetate, vinyl 2-chloropropionate, vinyl 3-chloropropionate, allyl chloroacetate, vinyl benzyl chloride and 5-chloromethyl-2-norbornene as well as the bromine-equivalent thereof obtained by replacing the chlorine atom in the above named compounds with a bromine atom, of which vinyl chloroacetate is preferred. Examples of the epoxy group-containing monomeric compound include glycidyl acrylate, glycidyl methacrylate, vinyl glycidyl ether, allyl glycidyl ether, methallyl glycidyl ether and the like, of which glycidyl methacrylate and allyl glycidyl ether are preferred. A preferable example of the monomeric organosilicon compound having a silicon-bonded vinyl group is 1,3,5,7-tetramethyl-1,3,5-trivinyl-7-(3-methacryloxypropyl)cyclotetrasiloxane though not particularly limitative thereto. These mercapto-reactive monomeric compounds can be used either singly or as a combination of two kinds or more according to need.

The monomer mixture of the acrylic monomer and the above described mercapto-reactive monomeric compound or compounds should be composed of from 90 to 99.9% by moles of the former monomer or monomers and from 10 to 0.1% by moles of the latter monomer or monomers. When the molar proportion of the mercaptoreactive monomer is too small or too large, no sufficient crosslinking density can be obtained or the crosslinking density is too high in the rubber vulcanizate resulting in poor mechanical strengths.

The amount of the acrylic monomer mixture to be added to the aqueous emulsion of the organopolysiloxane should be such that the polymerization mixture emulsified in the aqueous mixture is composed of from 90 to 1% by weight of the organopolysiloxane and from 10 to 99% by weight of the acrylic monomer mixture or, preferably, from 50 to 1% by weight of the organopolysiloxane and from 50 to 99% by weight of the acrylic monomer mixture. When the amount of the acrylic monomer is too small, no sufficient improvements can be obtained in the oil resistance and mechanical strengths of the rubber vulcanizate while, when the amount of the organopolysiloxane is too small, no sufficient improvements can be obtained in the heat and cold resistance of the rubber vulcanizate.

It is optional that the aqueous emulsion of the polymerization mixture is further admixed with other copolymerizable monomers including acrylonitrile, styrene, α-methyl styrene, acrylamide, vinyl chloride, vinylidene chloride, vinyl acetate and the like in an amount not to cause substantial alterations in the properties of the organopolysiloxane-modified acrylic polymer.

The copolymerization reaction of the acrylic monomer mixture in an aqueous emulsion of the organopolysiloxane is performed in the presence of a radical polymerization initiator. Suitable radical polymerization initiators include water-soluble ones, such as potassium persulfate, ammonium persulfate, hydrogen peroxide, tert-butyl hydroperoxide and the like, and monomer-soluble ones, such as benzoyl peroxide, cumene hydroperoxide, cumylperoxy neodecanoate, dibutyl peroxide, tert-hexylperoxy pivalate, diisopropylperoxy dicarbonate, tert-butylperoxy maleate, azobisisobutyronitrile and the like. A redox-type catalyst system can be used as the initiator when the copolymerization is performed at a temperature not exceeding 40° C. by combining the above named radical generating compound with a reducing agent such as sodium hydrogensulfite, l-ascorbic acid, sodium formaldehyde sulfoxylate, glucose, saccharose and the like and a trace amount of a water-soluble salt of iron (II), copper, cobalt or manganese.

The copolymerization reaction is performed usually at a temperature in the range from 0° to 80° C. but the polymerization temperature should be as low as possible from the standpoint of obtaining good workability of the rubber composition and improved properties of the rubber vulcanizate. It is possible to conduct the polymerization at a temperature lower than 0° C. by admixing the polymerization mixture with a lower alcohol or ethylene glycol. After completion of the copolymerization reaction, the polymerization mixture is admixed with a water-soluble salt such as calcium chloride to coagulate the copolymer which is separated from the aqueous medium, washed with water and dried to give the desired organopolysiloxane-modified acrylic polymer suitable for use as the component (a) in the inventive rubber composition.

The component (b) compounded with the above described rubbery polymer as the component (a) is a finely divided reinforcing filler. It is essential that the reinforcing filler has a specific surface area of at least 30 $m^2/g$ as determined by the BET method in order to fully exhibit the reinforcing effect. Various kinds of known fillers can be used as the component (b) including not only carbon blacks but also silica-based or siliceous fillers, such as fumed silica fillers produced by a dry process and available under tradenames of Aerosil, Cab-o-Sil and the like, precipitated silica fillers produced by a wet process from alkyl silicates, sodium silicate and the like, magnesium silicate and calcium silicate.

The amount of the reinforcing filler as the component (b) in the inventive rubber composition is in the range from 10 to 200 parts by weight or, preferably, from 30 to 80 parts by weight per 100 parts by weight of the rubbery polymer as the component (a). When the amount of the reinforcing filler is too small, no sufficient reinforcing effect can be obtained as a matter of course so that the rubber vulcanizate obtained from the rubber composition would have poor mechanical properties. When the amount of the reinforcing filler is too large, on the other hand, difficulties are caused in compounding the filler with the rubbery polymer as the component (a) or, even if a rubber composition could be obtained, the composition would have very poor workability in molding and the rubber vulcanizate also would have poor mechanical properties.

The component (c), which is the most characteristic ingredient in the inventive rubber composition, is a so-called acetylene alcohol or an alkylene oxide, i.e. ethylene oxide or propylene oxide, adduct thereof. The term of "acetylene alcohol" here implied includes various kinds of acetylenic compounds having at least one alcoholic hydrocy groups. So-called acetylne glycols are of course included. Such an acetylene alcohol compound is repre-sented by the general formula $$R^2-CMeG-C\equiv C-CMeG-R^2, \quad (III)$$

or $$R^2-CMeG-C\equiv CH, \quad (IV)$$

in which Me is a methyl group, $R^2$ is an alkyl group having 1 to 8 carbon atoms, such as methyl, ethyl, propyl, butyl, isobutyl, amyl, isoamyl, hexyl and 2-ethylhexyl groups, and G is a hydroxy group, a polyoxyethylene glycol residue of the formula $-(-O-C_2H_4-)_n-OH$ or a polyoxypropylene glycol residue of the formula $-(-O-C_3H_6-)_n-OH$, n being a positive integer not exceeding 50. In the acetylene alcohol compound represented by the general formula (III), it is optoional that the two groups denoted by $R^2$ are different from each other and the two groups denoted by G are different from each other in respect of the number n although the total value of the two values of n in the two groups G should not exceed 50.

Particular examples of the acetylene alcohol compound represented by the general formula (III) or (IV) given above include those having the following structural formulas:

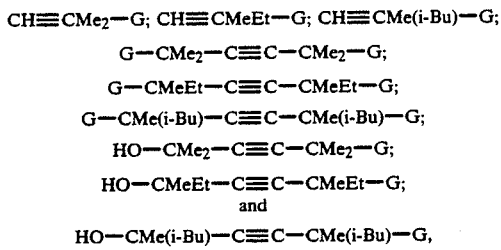

in which Me, Et and i-Bu denote methyl, ethyl and isobutyl groups, respectively, and G has the same meaning as defiend above. When the group denoted by G in the general formula (III) or (IV) is a hydroxy group, the compound is an acetylene alcohol and examples thereof include: 3-methyl-1-butyn-3-ol; 3,5-dimethyl-1-hexyn-3-ol; 2,5-dimethyl-3-hexyn-2,5-diol; 2,4,7,9-tetrameth-yl-5-decyn-4,7-diol; and the like. These acetylene alcohol compounds can be available on the market under the tradenames of, for example, Surfinols and Olfins produced and/or distributed by Air Products & Chemicals Inc., U.S.A., or Nissin Chemical Indus-try Co., Japan. It is, however, more preferable to use an alkylene oxide adduct of the acetylene alcohol compound as the component (c) than the acetylene alcohol compound as such. These acetylene alcohol compounds can be used either singly or as a combination of two kinds or more according to need.

The amount of the above described acetylene alcohol compound as the component (c) in the inventive rubber composition is in the range from 0.1 to 10 parts by weight per 100 parts by weight of the rubbery polymer as the component (a). When the amount of the component (c) is too small, the desired improving effect can hardly be obtained in the dispersibility of the reinforcing filler in the composition. On the other hand, no further improvements can be obtained even by increasing the amount of the component (c) in excess of the above mentioned upper limit.

In addition to the above described components (a), (b) and (c) as the essential ingredients, the inventive rubber composition may further be admixed with up to 10 parts by weight, per 100 parts by weight of the component (a), of an organopolysiloxane represented by the average unit formula $$R_aSiO_{(4-a)/2}, \quad (I)$$

in which R is a hydrogen atom or a substituted or unsubstituted monovalent hydrocarbon group and the subsctipt a is a positive number in the range from 1 to 2.5, having an average degree of polymerization not exceeding 40 or, preferably, not exceeding 30, as the component (d). It is known that such an organopolysiloxane is effective in increasing the dispersibility of a silica-based reinforcing filler in an organopolysiloxane to form a silicone rubber composition. It is, however, generally accepted that addition of such an organopolysiloxane is little effective in improving the dispersibility of a silica-based reinforcing filler in a rubbery matrix when the rubbery polymer is an organic polymer having a carbon-to-carbon main chain structure. To the contrary to this general understanding, it has been quite unexpectedly discovered that a synergistic effect can be obtained by the addition thereof when the rubber composition contains the acetylene alcohol compound as the component (c) so that the rubber composition is imparted with a remarkably decreased Mooney viscosity and improved workability in roll milling and molding resulting, as a consequence, in a greatly improved heat resistance and mechanical strengths of the rubber vulcanizate obtained from the composition. When such an organopolysiloxane is added to the composition, the amount thereof should be at least 0.1 part by weight but should not exceed 10 parts by weight per 100 parts by weight of the rubbery polymer as the component (a). In particular, a remarkable improvement can be obtained in the vulcanization behavior of the rubber composition when the rubbery polymer is an acrylic rubber or an organopolysiloxane-modified acrylic polymer which usually gives a shaped body before vulcanization having a relatively low green strength by dissolving the problem of an abnormal increase in the torque of the composition to increase the flowability of the composition even in a molding process of a relatively complicated form.

The group denoted by R in the above given average unit formula (I) is a hydrogen atom or a monovalent hydrocarbon group exemplified by alkyl groups, e.g., methyl, ethyl, propyl and butyl groups, alkenyl groups, e.g., vinyl group, aryl groups, e.g., phenyl and tolyl groups, cycloalkyl groups, e.g., cyclopentyl and cyclohexyl groups, and aralkyl groups, e.g., benzyl group, as well as those substituted monovalent hydrocarbon groups obtained by replacing a part or all of the hydrogen atoms in the above named hydrocarbon groups with halogen atoms and the like. The organopolysiloxane should preferably have a linear molecular structure terminated at each molecular chain end with a trialk-ylsilyl group, silanolic hydroxy group or a hydrolyzable atom or group without particular limitation.

Examples of the organopolysiloxane suitable as the component (d) include those compounds expressed by the following structural formulas, in which the symbols Me, Ph, Vi and Fp denote methyl, phenyl, vinyl and 3,3,3-trifluoropropyl groups, respectively, and the subscripts p, q and r are each a positive integer, p being 40 or smaller and q+r being 40 or smaller:

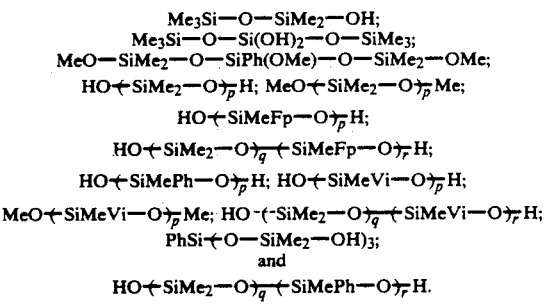

A particularly satisfactory improvement can be obtained by using the fluorine-containing diorganopolysiloxane of the above given formula HO—(—SiMeFp—O—)$_p$—H. These organopolysiloxanes can be used either singly or as a combination of two kinds or more according to need.

The rubber composition of the present invention can be prepared by uniformly blending the above described essential components (a), (b) and (c) and optional component (d) using a suitable rubber processing machine such as two-roller mills, kneaders, pressurizable kneaders, Banbury mixers, Intermixers and screw-type continuous blending machines. It is of course optional that the inventive rubber composition is further admixed with various kinds of known rubber additives such as antioxidants, oily processing aids, ultraviolet absorbers, coloring agents, extending fillers, aging retarders, vulcanizing accelerators and the like as well as vulcanizing agents. The thus compounded rubber composition of the invention can be molded and shaped into any desired form of rubber articles, e.g., O-rings, gaskets, tubes, sheets and the like, by any known molding method.

The type of the vulcanizing agent is not particularly limitative including various kinds of known ones. When the rubbery polymer as the component (a) has active halogen atoms as the crosslinking points, several kinds of trithiol-S-triazine compounds can be used, optionally, in combination with a dithiocarbamic acid derivative, 2,2′-dithiobis(benzothiazole), alkali or alkaline earth metal salt of carboxylate and the like or a combination of an alkali metal carboxylate and sulfur or an organic sulfur compound. Still better vulcanizability and stability in processing can be obtained by admixing an N-substituted mono- or bismaleimide compound, urea compound, thiourea compound, imidazoline compound, amino acid and the like.

When the crosslinking points of the rubbery polymer are provided by epoxy groups, suitable vulcanizing agents include salts of dithiocarbamic acid, ammonium carboxylates, diamine carbamates, polyamines, combinations of phthalic anhydride and an imidazole compound, combinations of a polyvalent carboxylic acid or anhydride of polyvalent carboxylic acid and a quaternary ammonium or phosphonium salt, combinations of a guanidine compound and sulfur or an organic sulfur compound and the like.

When the crosslinking points of the rubbery polymer are provided by silicon-bonded vinyl groups, suitable vulcanizing agents include organic peroxides exemplified by dicumyl peroxide, tert-butyl cumyl peroxide, 2,5-dimethyl-2,5-bis(tert-butylperoxy) hexane and the like.

The amount of the vulcanizing agent compounded in the inventive rubber composition is usually in the range from 0.1 to 10 parts by weight per 100 parts by weight of the rubbery polymer as the component (a). When the amount of the vulcanizing agent is too small, no substantial vulcanizing effect can be obtained. When the amount thereof is too large, on the other hand, the crosslinking density in the rubber vulcanizate would be unduly high to cause a remarkable decrease in the mechanical properties as a rubber.

The rubber composition of the invention has an outstandingly low Mooney viscosity by virtue of the addition of the specific and unique component (c) as compared with a conventional rubber composition of the same formulation excepting this ingredient and exhibits excellent workability in roll milling and molding. In addition, a remarkable improvement can be obtained in the elongation of the vulcanizate prepared from the composition. Moreover, no adverse influences are caused by the addition of the component (c) in the mechanical properties of the vulcanizate in contrast to a polyethylene glycol as a known dispersing aid of fillers which more or less causes certain adverse effects on the mechanical properties or, in particular, on the permanent compression set of the vulcanizate. Accordingly, the inventive rubber composition is very useful as a material of various kinds of rubber articles such as sealing materials, O-rings, gaskets, tubes, insulation of electric wires and cables and the like.

In the following, the rubber composition of the present invention is described in more detail by way of examples, in which the term of "parts" always refers to "parts by weight".

EXAMPLE 1

A rubber composition was prepared by uniformly blending, on a 6-inch roller mill, 100 parts of an acrylic elastomer (Toa-acron AR-840, a product by Toa Paint Co.), 50 parts of a precipitated silica filler having a specific surface area of 230 m$^2$/g (Nipsil LP, a product by Nippon Silica Co.), 2 parts of Naugard 445 (a product by Uniroyal Co.), 1 part of stearic acid, and 1 part of an acetylene alcohol derivative which was an adduct of 3.5 moles of ethylene oxide to 2,4,7,9-tetramethyl-5-decyn-4,7-diol (Surfinol 440, a product by Air Products & Chemicals Inc.) and milling was further continued for 10 minutes with the temperature of the milling roller increased to 130° C. to remove the moisture contained in the silica filler. The thus prepared blend was subjected to the measurement of the Mooney viscosity ML$_{1+4}$(100° C.) to give a value shown in Table 1 as a measure of the workability. The workability of the composition in roll milling was good.

The rubber blend above was further admixed with 1.5 parts of trithio cyanuric acid, 5 parts of magnesium oxide and 1.5 parts of zinc dimethyl dithiocarbamate to give a vulcanizable rubber composition which was press-vulcanized at 165° C. for 12 minutes followed by a post-vulcanization treatment for 8 hours in an oven at 175° C. to give a vulcanized rubber sheet having a thickness of 2 mm.

The thus prepared vulcanized rubber sheet was subjected to the measurement of the mechanical properties according to the procedure specified in JIS K 6301 to give the results shown in Table 1.

EXAMPLES 2 TO 4 AND COMPARATIVE EXAMPLE 1

The formulation of the rubber composition and the conditions of testing in each of these examples and comparative example were the same as in Example 1 described above excepting increase of the amount of Surfinol 440 to 2.5 parts and 5 parts in Examples 2 and 3, respectively, replacement of Surfinol 440 with 2.5 parts of another acetylene alcohol derivative, i.e. 3.5 moles adduct of propylene oxide to 2,4,7,9-tetramethyl-5-decyn-4,7-diol in Example 4 and omission of the acetylene alcohol derivative in Comparative Example 1. Tables 1 and 2 below show the Mooney viscosity of the rubber blends and the mechanical properties of the vulcanized rubber sheets obtained there. The workability of the rubber composition in roll milling was good in Examples 2 to 4 but poor in Comparative Example 1.

As is understood from the results shown in the tables, the rubber composition is imparted with a decreased Mooney viscosity and good workability by the addition of an acetylene alcohol derivative presumably due to the improved dispersibility of the silica filler along with a great increase in the tensile strength of the vulcanized rubber sheet.

EXAMPLES 5 AND 6 AND COMPARATIVE EXAMPLES 2 AND 3.

The formulation of the rubber composition in Example 5 was: 100 parts of an EPDM rubber (Esprene 512F, a product by Sumitomo Chemical Co.); 1 part of stearic acid, 50 parts of the same silica filler as used in Example 1; 5 parts of zinc oxide; 2.5 parts of Surfinol 440 (see Example 1); 1.5 parts of a first vulcanization accelerator (Nocceler TT, a product by Ouchi Shinko Co.); 1.5 parts of a second vulcanization accelerator (Nocceler PZ, a product by the same company as above); 0.5 part of a third vulcanization accelerator (Nocceler M, a product by the same company as above); and 1.5 parts of sulfur.

The formulation of the rubber composition in Comparative Example 2 was the same as in Example 5 excepting omission of the acetylene alcohol derivative.

The formulation of the rubber composition in Example 6 was: 100 parts of NBR (Nippor 1042, a product by Nippon Zeon Co.); 1 part of stearic acid; 50 parts of the same silica filler as used in Example 5; 5 parts of zinc oxide; 2.5 parts of the same acetylene alcohol derivative as in Example 5; 15 parts of dioctyl phthalate; 0.2 part of the first vulcanization accelerator used in Example 5; 1.5 parts of a fourth vulcanization accelerator (Nocceler DM, a product by the same company as above); and 2 parts of sulfur.

The formulation of the rubber composition in Comparative Example 3 was the same as in Example 6 excepting omission of the acetylene alcohol derivative.

Each of these four rubber compositions was press-vulcanized at 150° C. for 15 minutes (Example 5 and Comparative Example 2) or at 148° C. for 20 minutes (Example 6 and Comparative Example 3) into a vulcanized rubber sheet.

Tables 1 and 2 below show the Mooney viscosity of the rubber blends and the mechanical properties of the vulcanized rubber sheets in these examples and comparative examples. The workability of the rubber composition was good in Examples 5 and 6 but poor in Comparative Examples 2 and 3.

EXAMPLE 7

The formulation of the rubber composition was the same as in Example 2 excepting further admixture of 2.5 parts of a first organopolysiloxane which was 1,5-dihydroxy-1,3,5-trimethyl-1,3,5-tri(3,3,3-trifluoropropyl) trisiloxane. The rubber composition was processed and vulcanized into a vulcanized rubber sheet under the same conditions as in Example 1. The workability of the composition in roll milling was good and no abnormal increase in torque was noted in molding as is graphically illustrated in the figure of the accompanying drawing by the curve I together with a similar result obtained with the composition prepared in Comparative Example 1 shown by the curve II. Table 1 below shows the Mooney viscosity of the rubber blend and the mechanical properties of the vulcanized rubber sheet.

EXAMPLES 8 AND 9

The formulation of the rubber composition in Example 8 was the same as in Example 7 excepting replacement of the organopolysiloxane with the same amount of a second organopolysiloxane of the formula $HO-(-SiMe_2-O-)_{10}-H$, in which Me is a methyl group.

The formulation of the rubber composition in Example 9 was the same as in Example 7 excepting replacement of the acetylene alcohol derivative with the same amount of the same acetylene alcohol derivative as used in Example 4.

Table 1 below also shows the Mooney viscosity of the rubber blends and the mechanical properties of the vulcanized rubber sheets obtained from these two rubber compositions.

EXAMPLES 10 AND 11

The formulation of the rubber composition in Example 10 was the same as in Example 5 excepting further admixture of 2.5 parts of the first organopolysiloxane used in Example 7.

The formulation of the rubber composition in Example 11 was the same as in Example 6 excepting further admixture of 2.5 parts of the same organopolysiloxane as used in Example 10.

These rubber compositions had good workability in roll milling. Table 1 below shows the Mooney viscosity of the rubber blends and the mechanical properties of the vulcanized rubber sheets prepared from the rubber compositions by press-vulcanization at 150° C. for 15 minutes (Example 10) or at 148° C. for 20 minutes (Example 11).

EXAMPLES 12 TO 14 AND COMPARATIVE EXAMPLE 4

An organopolysiloxane-modified acrylic polymer, referred to as the polymer P-1 hereinbelow, was prepared in the following manner.

Thus, a mixture of 1500 parts of octamethyl cyclotetrasiloxane, 40.8 parts of a 3-mercaptopropyl methyl siloxane, 1500 parts of pure water, 15 parts of sodium lauryl sulfate and 10 parts of dodecylbenzene sulfonic acid was emulsified by agitating using a homomixer and then passed twice through a homogenizer under a pressure of 3000 psi to give a stable aqueous emulsion of the organopolysiloxanes.

The emulsion was heated in a flask at 70° C. for 12 hours and kept standing for 24 hours after cooling to room temperature. Thereafter, a small amount of sodium carbonate was added thereto to adjust the pH of the emulsion to 7 and nitrogen gas was blown for 4 hours into the emulsion which was then subjected to steam distillation to remove volatile organopolysiloxanes. The content of the non-volatile matter in this emulsion was adjusted to 33% by weight by the addition of pure water. The dispersed phase in this emulsion was a methyl polysiloxane of which 1.5% by moles of the organic groups were 3-mercaptopropyl groups.

Into a reaction vessel equipped with a stirrer, reflux condenser, thermometer and nitrogen gas inlet were introduced 758 parts of the above prepared emulsion containing 250 parts of the organopolysiloxane together with 1200 parts of pure water and the thus diluted emulsion was chilled at 10° C. under a stream of nitrogen gas and admixed with 0.40 part of tert-butyl hydroperoxide, 2.0 parts of l-ascorbic acid and 0.001 part of iron (II) sulfate heptahydrate. A mixture of 364.5 parts of ethyl acrylate and 10.5 parts of vinyl chloroacetate was added dropwise to the emulsion in the reaction vessel over a period of 3 hours under agitation to effect the polymerization reaction which was completed by further continuing agitation for additional one hour. The thus obtained polymerization mixture was admixed with a saturated aqueous solution of calcium chloride to coagulate the polymer which was collected by filtration, washed with water and dried to give an organopolysiloxane-modified acrylic polymer referred to as the polymer P-1. This polymer P-1 had a Mooney viscosity $ML_{1+4}$(100° C.) of 40.

The formulation of the rubber composition in Example 12 was the same as in Example 1 excepting replacement of the acrylic elastomer with the same amount of the polymer P-1 prepared as above and the precipitated silica filler with the same amount of a fumed silica filler having a specific surface area of 200 $m^2/g$ (Aerosil 200, a product by Nippon Aerosil Co.). The conditions for the preparation of the rubber composition and vulcanization thereof into a vulcanized rubber sheet were substantially the same as in Example 1. Table 1 below shows the Mooney viscosity $ML_{1+4}$(100° C.) of the rubber blend and the mechanical properties of the vulcanized rubber sheet. The workability of the composition in roll milling and molding was good to give a smooth surface of the milled composition.

The formulation of the rubber composition in each of Examples 13 and 14 was the same as in Example 12 except that the amount of the acetylene alcohol derivative was increased to 2 parts and 5 parts, respectively. The smoothness of the surface of the milled rubber composition was the best in Example 14.

The formulation of the rubber composition in Comparative Example 4 was the same as in Example 12 excepting omission of the acetylene alcohol derivative. The workability of the composition in roll milling and molding was poor and the milled composition had a creasy and rugged surface.

The tables below show the Mooney viscosity of the rubber blends and the mechanical properties of the vulcanized rubber sheets prepared from the compositions in these experiments.

EXAMPLES 15 TO 17 AND COMPARATIVE EXAMPLE 5

Another organopolysiloxane-modified acrylic polymer, referred to as the polymer P-2 hereinbelow, was prepared in substantially the same manner as in the preparation of the polymer P-1 except that the amount of the organopolysiloxane emulsion was decreased to 379 parts corresponding to 125 parts of the organopolysiloxane and the acrylic monomer was replaced with a combination of 342.5 parts of n-butyl acrylate and 147 parts of 2-methoxyethyl acrylate.

The formulation of the rubber composition in Example 15 was the same as in Example 12 excepting replacement of the polymer P-1 with the same amount of the polymer P-2 prepared above, the fumed silica filler with the same amount of a precipitated silica filler having a specific surface area of 230 $m^2/g$ (Nipsil $PVN_3$, a product by Nippon Silica Co.) and the acetylene alcohol derivative with the same amount of another acetylene alcohol derivative, i.e. 10 moles ethylene oxide adduct of 2,4,7,9-tetramethyl-5-decyn-4,7-diol (Surfinol 465, a product of the same company as Surfinol 440).

The formulation of the rubber composition in Example 16 was the same as in Example 15 except that the amount of the acetylene alcohol derivative was increased to 2 parts.

The formulation of the rubber composition in Example 17 was the same as in Example 16 excepting omission of the trithio cyanuric acid, magnesium oxide and zinc dimethyl dithio carbamate and, instead, addition of 0.3 part of sulfur, 0.25 part of potassium stearate and 3 parts of sodium stearate.

The formulation of the rubber composition in Comparative Example 5 was the same as in Example 15 excepting omission of the acetylene alcohol derivative.

The conditions for the preparation of the rubber composition and vulcanization of the composition into a vulcanized rubber sheet in each of these experiments were the same as in Example 1. The compositions in Examples 15 to 17 each had good workability in roll milling while the workability of the composition in Comparative Example 5 was poor. The tables below show the Mooney viscosity of the rubber blends and the mechanical properties of the vulcanized rubber sheets in each of these experiments.

EXAMPLES 18 TO 21 AND COMPARATIVE EXAMPLE 6

The formulation of the rubber composition in each of Examples 18, 19, 20 and 21 was the same as in Example 1 except that the acrylic elastomer was replaced with the same amount of the polymer P-2, the amount of the acetylene alcohol derivative was increased to 2 parts, the amount of the precipitated silica filler was 30 parts, 40 parts, 50 parts and 60 parts, respectively, and 5 parts of an α,ω-hydroxy-terminated dimethyl polysiloxane fluid having a viscosity of 20 centistokes at 25° C. were additionally added.

The formulation of the rubber composition in Comparative Example 6 was the same as in Example 19 excepting replacement of the precipitated silica filler with the same amount of a fine silica powder having a specific surface area of 19 $m^2/g$ (Crystalite VXS, a product by Tatsumori Co.).

The conditions for the preparation of the rubber composition and vulcanization of the rubber composition into a vulcanized rubber sheet in each of these experiments were substantially the same as in Example 1. The workability in roll milling and molding was good in each of the experiments. The tables below show the Mooney viscosity of the rubber blends and the mechanical properties of the vulcanized rubber sheets in each of the experiments.

EXAMPLE 22 AND COMPARATIVE EXAMPLE 7

The formulation of the rubber composition in Example 22 was the same as in Example 20 except that the amount of the acetylene alcohol derivative was increased to 10 parts and the dimethyl polysiloxane fluid was omitted. The formulation of the rubber composition in Comparative Example 7 was the same as in Example 22 excepting replacement of the acetylene alcohol derivative with the same amount of a polyethylene glycol (Nissan Polyethylene glycol #4000, a product by Nissan Chemical Co.).

The conditions for the preparation of the rubber composition and vulcanization of the composition into a vulcanized rubber sheet in each of these experiments were substantially the same as in Example 1. The composition in Example 22 had good workability in roll milling while remarkable sticking of the composition to the surface of the milling roller took place in the roll milling works in Comparative Example 7. The Mooney viscosity of the rubber blends in Example 22 and Comparative Example 7 was 43 and 42, respectively, but the rubber vulcanizates in Example 22 and Comparative Example 7 exhibited 43% and 44% of the elastic resilience and 38% and 51% of the permanent compression set, respectively.

TABLE 1

| Example No. | Mooney viscosity | Hardness, JIS A | Tensile strength, kg/cm$^2$ | Ultimate elongation, % | 100% modulus, kg/cm$^2$ |
|---|---|---|---|---|---|
| 1 | 65 | 82 | 136 | 224 | — |
| 2 | 62 | 80 | 140 | 225 | — |
| 3 | 57 | 78 | 130 | 255 | — |
| 4 | 61 | 79 | 135 | 210 | — |
| 5 | 88 | 71 | 301 | 564 | 20 |
| 6 | 63 | 59 | 195 | 540 | 15 |
| 7 | 55 | 73 | 143 | 298 | — |
| 8 | 60 | 77 | 138 | 250 | — |
| 9 | 57 | 78 | 142 | 190 | — |
| 10 | 82 | 70 | 350 | 810 | 21 |
| 11 | 62 | 57 | 237 | 630 | 18 |
| 12 | 60 | 70 | 140 | 470 | — |
| 13 | 55 | 68 | 135 | 480 | — |
| 14 | 50 | 65 | 120 | 500 | — |
| 15 | 58 | 68 | 120 | 300 | — |
| 16 | 53 | 66 | 115 | 310 | — |
| 17 | 52 | 67 | 121 | 305 | — |
| 18 | 44 | 55 | 76 | 350 | — |
| 19 | 46 | 59 | 90 | 330 | — |
| 20 | 50 | 65 | 120 | 320 | — |
| 21 | 55 | 70 | 120 | 300 | — |

TABLE 2

| Comparative Example No. | Mooney viscosity | Hardness, JIS A | Tensile strength, kg/cm$^2$ | Ultimate elongation, % | 100% modulus, kg/cm$^2$ |
|---|---|---|---|---|---|
| 1 | 86 | 86 | 116 | 125 | — |
| 2 | 199 | 72 | 212 | 780 | 17 |
| 3 | 91 | 60 | 147 | 570 | 13 |
| 4 | 90 | 80 | 150 | 450 | — |
| 5 | 85 | 75 | 110 | 280 | — |
| 6 | 42 | 50 | 50 | 150 | — |

What is claimed is:

1. A rubber composition which comprises, as a blend:
   (a) 100 parts by weight of a rubbery polymer which is natural rubber or a synthetic rubber selected from the group consisting of styrene-butadiene copolymeric rubbers, acrylonitrile-butadiene copolymeric rubbers, hydrogenated acrylonitrile-butadiene copolymeric rubbers, polybutadiene rubbers, polyisoprene rubbers, polychloroprene rubbers, ethylene-propylene copolymeric rubbers, terpolymeric rubbers of ethylene, propylene and a diene monomer, acrylic rubbers, ethylene-acrylic ester copolymeric rubbers, ethylene-vinyl acetate copolymeric rubbers, urethane rubbers, polysulfide rubbers, chlorosulfonated polyethylene rubbers, chlorinated polyethylene rubbers, fluorocarbon rubbers, epichlorohydrin rubbers or mixtures thereof;
   (b) from 10 to 200 parts by weight of a finely divided reinforcing filler having a specific surface area of at least 30 m$^2$/g; and
   (c) from 0.1 to 10 parts by weight of an alkylene oxide adduct of an acetylene alcohol.

2. The rubber composition as claimed in claim 1 which further comprises:
   (d) up to 10 parts by weight, per 100 parts by weight of the component (a), of an organopolysiloxane represented by the average unit formula $$R_aSiO_{(4-a)/2},$$

in which R is a hydrogen atom or a substituted or unsubstituted monovalent hydrocarbon group and the subsctipt a is a positive number in the range from 1 to 2.5, having an average degree of polymerization not exceeding 40.

3. The rubber composition as claimed in claim 1 in which the alkylene oxide adduct of acetylene alcohol is represented by the general formula $$R^2-CMeG-C\equiv C-CMeG-R^2$$

or $$R^2-CMeG-C\equiv CH$$

in which Me is a methyl group, $R^2$ is an alkyl group having 1 to 8 carbon atoms and G is a polyoxyethylene glycol residue of the formula $-(-O-C_2H_4-)_n-OH$ or a polyoxypropylene glycol residue of the formula $-(-O-C_3H_6-)_n-OH$, n being a positive integer not exceeding 50.

4. The rubber composition as claimed in claim 1 in which the rubbery polymer is an acrylic rubber or an organopolysiloxane-modified acrylic polymer.

5. The rubber composition as claimed in claim 1 in which the finely divided reinforcing filler is a siliceous filler.

6. The rubber composition as claimed in claim 2 in which the organopolysiloxane as the component (d) is a fluorine-containing diorganopolysiloxane represented by the general formula $HO-(-SiMeFp-O-)_p-H$, in which Me is a methyl group, Fp is a 3,3,3-trifluoropropyl group and the subscript p is a positive integer.

* * * * *